US008995917B2

(12) United States Patent
Eichinger et al.

(10) Patent No.: US 8,995,917 B2
(45) Date of Patent: Mar. 31, 2015

(54) METHOD, SYSTEM AND RADIO STATION FOR INTERFERENCE CANCELLATION

(75) Inventors: Josef Martin Eichinger, Neufinsing (DE); Thomas Haustein, München (DE); Volker Jungnickel, Berlin (DE); Wolfgang Zirwas, München (DE); Clemens von Helmolt, Berlin (DE)

(73) Assignees: Nokia Siemens Networks GmbH & Co. KG, Munich (DE); Fraunhofer Gesellschaft zur Foerderung der Angewandten Forschung E.v., Munich (DE)

( * ) Notice: Subject to any disclaimer, the term of this patent is extended or adjusted under 35 U.S.C. 154(b) by 1871 days.

(21) Appl. No.: 12/225,436

(22) PCT Filed: Feb. 8, 2007

(86) PCT No.: PCT/EP2007/051231
§ 371 (c)(1),
(2), (4) Date: Oct. 8, 2010

(87) PCT Pub. No.: WO2007/107409
PCT Pub. Date: Sep. 27, 2007

(65) Prior Publication Data
US 2011/0033186 A1 Feb. 10, 2011

(30) Foreign Application Priority Data
Mar. 21, 2006 (EP) .................................. 06005752

(51) Int. Cl.
*H04B 1/00* (2006.01)
*H04B 15/00* (2006.01)
*H04B 1/12* (2006.01)

(52) U.S. Cl.
CPC ................................. *H04B 1/126* (2013.01)
USPC ...................................... 455/63.1; 455/296

(58) Field of Classification Search
CPC .... H04B 1/7105; H04B 7/2125; H04B 1/123; H04B 1/126; H04L 25/03006; H04L 25/03821; H04J 14/00; H04J 14/0278; H04J 14/0284

USPC ............ 375/E1.025; 398/43, 79, 82, 89, 115; 455/63.1, 296, 303
See application file for complete search history.

(56) References Cited

U.S. PATENT DOCUMENTS 5,799,004 A     8/1998   Keskitalo et al.
5,894,500 A *   4/1999   Bruckert et al. .............. 375/346
(Continued)

FOREIGN PATENT DOCUMENTS

EP     0 766 416     4/1997

OTHER PUBLICATIONS

P. Ranta et al. "TDMA Cellular Network Application of an Interference Cancellation Technique" Vehicular Technology Conference, IEEE, vol. 1, Jul. 25, 1995; pp. 296-300.
X. Tao et al. "Capacity Analyses for a Generalized Distributed Antenna Architecture for Beyond 3G Systems" IEEE VTC Spring 2005, vol. 5; pp. 3193-3196.
(Continued)

*Primary Examiner* — Yuwen Pan
*Assistant Examiner* — Ayodeji Ayotunde

(57) ABSTRACT

A method detects a first baseband signal sent by a first sending station via an air interface to a first radio station of a radio communications system. A first receive signal, which contains the first baseband signal superposed with at least a second baseband signal sent by a second sending station to a second radio station, is received by the first radio station. The first radio station uses at least a second receive signal received by the second radio station for detection of the first baseband signal. The second receive signal contains at least the second baseband signal, and is used to at least partially cancel the interference in the first receive signal caused by the second baseband signal.

15 Claims, 4 Drawing Sheets

(56) References Cited

U.S. PATENT DOCUMENTS

| | | | | |
|---|---|---|---|---|
| 2002/0061073 A1* | 5/2002 | Huang et al. | ............. | 375/295 |
| 2002/0159547 A1* | 10/2002 | Lindoff et al. | ............. | 375/343 |
| 2005/0025044 A1* | 2/2005 | Pitio | ............. | 370/220 |
| 2006/0067446 A1* | 3/2006 | Maeda et al. | ............. | 375/349 |
| 2008/0261551 A1* | 10/2008 | Catreux-Erceg et al. | ..... | 455/272 |

OTHER PUBLICATIONS

A. Vanelli-Coralli et al. "Capacity of Cell Clusters with Coordinated Processing" USCD Inaugural workshop on Information theory and its applications, Feb. 6-10, 2006.

A. Sezgin et al. "Antenna Selection with Capacity-Approaching Space-Time Block Codes" IEEE, 2004; pp. 1291-1294.

* cited by examiner

METHOD, SYSTEM AND RADIO STATION FOR INTERFERENCE CANCELLATION

CROSS REFERENCE TO RELATED APPLICATIONS

This application is based on and hereby claims priority to European Application No. EP06005752 filed on Mar. 21, 2006 and PCT Application No. PCT/EP2007/051231 filed on Feb. 8, 2007, the contents of which are hereby incorporated by reference.

BACKGROUND OF THE INVENTION

The invention concerns a method for detecting a first baseband signal sent by a first sending station via an air interface to a first radio station of a radio communications system as well as a respective first radio station and a respective radio communications system.

In recent years, much research has been conducted on multiple-input multiple-output (MIMO) systems and a large number of algorithms have been developed, mostly for wireless LAN (Local Area Network) and partly for cellular radio communication systems. They have been proposed to support a single terminal with multiple antennas (as in MIMO WLAN or HSDPA) or to support multiple terminals, both from a single base station with multiple antennas (which is called space-division multiple access, SDMA). These approaches can partly be used to cancel interference provided that there are unused degrees of freedom, i.e., less terminal antennas than base station antennas.

When for instance in the up-link terminals and base stations are well synchronized and the channels between all terminals and base stations are known, the multi-user multi cell scenario can be regarded as a generalized MIMO channel, where terminal antennas form the inputs and the antennas at multiple base stations the outputs.

It is well known under the term service area concept that joint transmission and detection of user signals controlled by a central unit can cancel the interference within a service area—which has two or more base stations—completely. In the ideal case of so-called "writing on dirty paper" inter-cell interference can be cancelled without any performance degradation.

The centralized service area concept suffers from high complexity. In principle, the larger a service area the larger the complexity and, of course, the more interference can be cancelled inside the service area. Previous investigations showed however that the service area concept works fine inside a service area but the same problems as for single cells without coordination arise now on a larger scale at the boundaries of the service area.

The service area concept requires interconnections with high data rate to transport the signals from all base stations to one central unit where a computationally complex problem must be solved. Note that the complexity rises at least with the third order of the number of base stations involved. It is not taken into account that at some locations only little interference may be present. This is handled in the same manner as high interference.

In X. Tao, C. Tang, Z. Dai, X. Xu, B. Liu, P. Zhang "Capacity Analysis for a Generalized Distributed Antenna Architecture for Beyond 3G Systems" in *Proc. VTC Spring* 2005, Stockholm, Sweden, Vol. 5, pp. 3193-3196, a sliding group-cell concept has been proposed in which a central unit has been used. When a terminal moves through a service area, the central unit forms subgroups of cells for joint transmission and detection in order to reduce the complexity. When the terminal is mobile, the position is tracked and new subgroups are formed.

In A. Vanelli-Coralli, R. Padovani, J. Hou, J. E. Smee, "Capacity of Cell Clusters with Coordinated Processing", USCD Inaugural workshop on Information theory and it's applications", La Jolla, Calif., Feb. 6-10, 2006, the service area concept is denoted as scenario C.

SUMMARY

One potential object is to provide an improved method for cancelling interference in up-link transmissions in a radio communications system, which can be implemented with less complexity than methods used in service area concepts. It is a further object to provide a respective radio station as well as a respective radio communications system.

The inventors propose a method for detecting a first baseband signal sent by a first sending station via an air interface to a first radio station of a radio communications system, whereas a first receive signal, which contains the first baseband signal superposed with at least a second baseband signal sent by a second sending station to a second radio station, is received by the first radio station. The first radio station uses at least a second receive signal received by the second radio station for detection of the first baseband signal, whereas the second receive signal contains at least the second baseband signal, by at least partially cancelling the interference in the first receive signal caused by the second baseband signal.

Advantageously, a pilot sequence sent by the second sending station is received at the first radio station, the pilot sequence identifying the second sending station (M2) and being usable for channel estimation.

It is further useful if the pilot sequence additionally identifies the second radio station as serving radio station of the second sending station.

Alternatively, the second radio can send an identifier of the second sending station, e.g., a MAC-ID (Medium Access Control-Identifier), identifying the second sending station. Further the second sending station can alternatively send an identifier of the second radio station, identifying the second radio station.

Advantageously, the second receive signal is used for detecting the first baseband signal if a reception power of the pilot sequence is greater or equal to a threshold and/or if its use reduces a residual interference contained in a detection signal which results when detecting the first baseband signal from the first receive signal.

In one embodiment a meshed network is used to connect the first radio station and the at least second radio station.

Advantageously, the first radio station and the at least second radio station are part of the same mesh.

Computational could be further reduced, if the first radio station only considers receive signals of radio stations being part of the same mesh as the first radio station.

Advantageously, the second receive signal is received at the first radio station via a broadcast message broadcasted by the second radio station.

Especially if at least the part of the network containing the first radio station and the second radio station is organized using the Internet Protocol, the second receive signal is advantageously requested by the first radio station from the second radio station.

Advantageously, the second receive signal contains pilot sequences of sending stations whose baseband signals are contained in the second receive signal, whereas the pilot sequences are usable for channel estimation.

The inventors also propose a radio communications system having a first radio station and at least a second radio station, to perform the proposed method.

The first radio station for a radio communications system, has a unit to detect a first baseband signal sent by a first sending station via an air interface to the first radio station and a unit to receive a first receive signal, whereas the first receive signal contains the first baseband signal superposed with at least a second baseband signal sent by a second sending station to a second radio station, and a unit to detect the first baseband signal are configured to use at least a second receive signal received by the second radio station for detection of the first baseband signal, whereas the second receive signal contains at least the second baseband signal, by at least partially cancelling the interference in the first receive signal caused by the second baseband signal.

Advantageously, the first radio station further provides all means necessary to perform the inventive method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
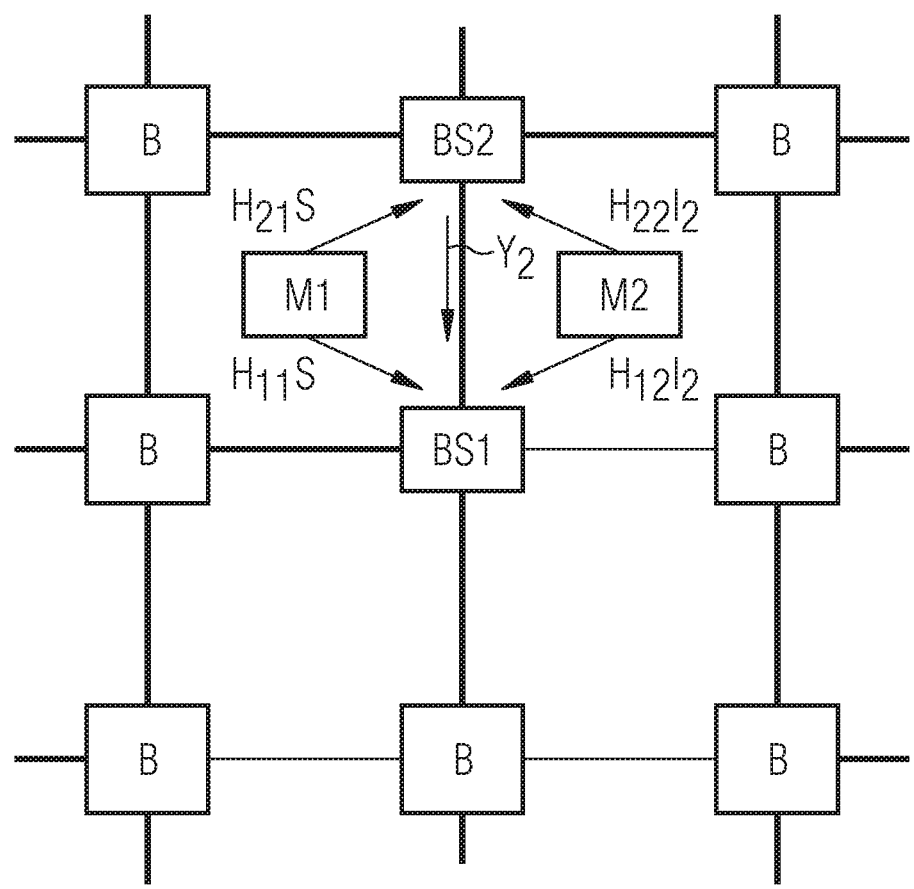
FIG. 1 meshed network showing an example of the proposed method.

Reference will now be made in detail to the preferred embodiments of the present invention, examples of which are illustrated in the accompanying drawings, wherein like reference numerals refer to like elements throughout.

A sending station is for example a terminal of a radio communications system.

A radio station is for example a base station of a radio communications system.

A terminal is for instance a mobile radio terminal, particularly a mobile phone or a flexible of fixed device, for transmission of picture data and/or sound data, for fax, short message service (SMS) messages and/or E-mail messages, and/or for internet access.

The proposed method can advantageously be used in any kind of communications system. A communications system is for example a computer network or a radio communications system.

Radio communications systems are systems in which a data transmission between terminals is performed over an air interface. The data transmission can be both bidirectional and unidirectional. Radio communications systems are particularly cellular radio communication systems, e.g., according to the GSM (Global System for Mobile Communications) standard or the UMTS (Universal Mobile Telecommunication System) standard. Also future mobile radio communications systems, e.g., according to the fourth generation, as well as ad-hoc-networks shall be understood as radio communication systems. Radio communication systems are also wireless local area networks (WLAN) according to standards from the Institute of Electrical and Electronics Engineers (IEEE) like 802.11a-i, HiperLAN1 and HiperLAN2 (High Performance Radio Local Area Network) as well as Bluetooth-Networks.

FIG. 1 shows an example of a decentralized meshed service area (DMSA) concept. A meshed backbone network is proposed for the DMSA. Each node (i.e., each base station) contains the intelligence needed for local interference reduction. In FIG. 1 a first sending station M1 is assigned to a first radio station BS1 and a second sending station M2 is assigned to a second radio station. The first sending station M1 transmits a first baseband signal S to the first radio station BS1. The first baseband signal S is also received by at least the second radio station BS2. The second sending station M2 transmits a second baseband signal $I_2$ to the second radio station BS2. The second baseband signal $I_2$ is also received by at least the first radio station BS2. FIG. 1 additionally shows seven radio stations B connected via a meshed network with each other and with the first radio station and the second radio station.

Figure 2:
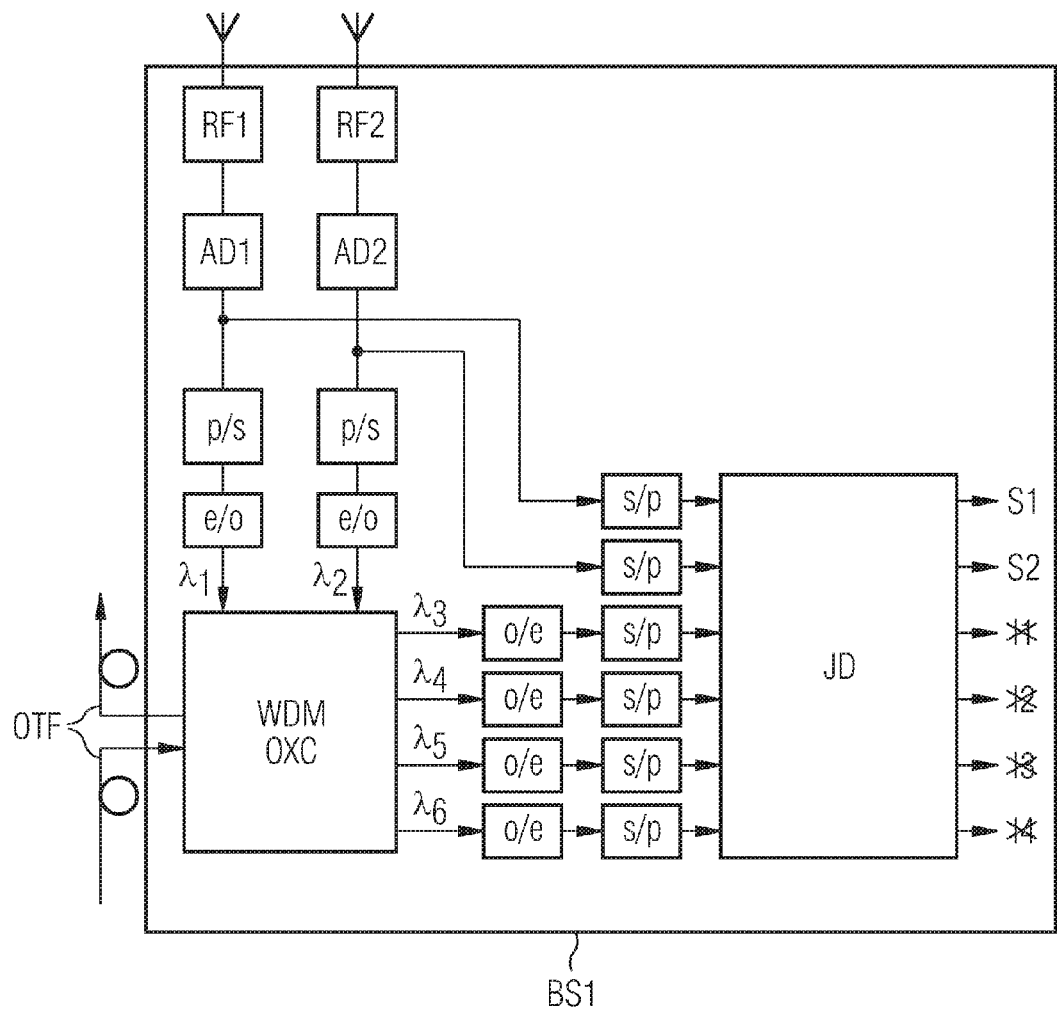
FIG. 2 a schematic example of the proposed radio station.

The inventors propose that the signal processing is distributed across the network and not centralized in a single central unit. Each radio station has the capability to spatially separate signals from multiple sending stations. However, the number of locally separable streams should be larger than the number of physical antennas at a radio station. For instance, each radio station could have two own antennas but the signal processing capability to separate six signals of sending stations. FIG. 2 schematically shows the first radio station BS1 as an example for the configuration of a radio station. The first radio station BS1 has two own antennas, two radio frontends RF1, RF2, and two analog-to-digital converters AD1, AD2. After the analog-to-digital converters AD1, AD2, the signals are converted from parallel to serial p/s and the serial streams are modulated e/o onto optical signals operating at two wavelengths $\lambda_1$ and $\lambda_2$. Using an optical cross connect OXC, these signals are multiplexed onto an optical transport fiber OTF through which all radio stations in a mesh are connected. The optical cross connect OXC may also be connected to other fibers from other meshes.

Over the optical transport fiber OTF, the first radio station BS1 has access to the received signals from adjacent radio stations. The relevant optical signals are coupled out, converted o/e both in the electrical domain and then from serial to parallel s/p. Finally, they are read into a joint detection unit JD, together with the signals received at the first radio station. The joint detection unit JD has in each receive branch a mechanism to estimate the channels not only within the cell served by the first radio station, but also from sending stations in adjacent cells.

Realization of Partial Interference Cancellation

Consider as an example the first sending station M1 and the second sending station M2 which are assigned to the same resource (e.g. frequency and/or code and/or time slot) in both cells which is assumed to create inter-cell interference. Now the first sending station M1 and the second sending station M2 both transmit pilot sequences which do not only identify their own antenna or antennas but also the cell, i.e., the radio station, to which they are assigned.

Generally, based on this information, each serving radio station, e.g., the first radio station and the second radio station in FIG. 1, can estimate the channel coefficients of the desired and of the interfering sending stations. From the outputs of the corresponding correlation circuit bench, which is part of each receive branch in the respective joint detection unit, the serving radio station identifies also to which radio station the interfering sending stations are assigned to.

In order to remove the interference, the serving radio station may involve the received signals from the so identified adjacent radio stations and separates the desired signal of a sending station from the interference using the multi-stream separation capability of its joint detection unit.

As shown in FIG. 1 the first radio station BS1 wishes to detect the first baseband signal S having the channel $H_{11}$. The reception of the first baseband signal S is disturbed by the second baseband signal $I_2$. A first receive signal $Y_1$ at the first radio station BS1, neglecting noise, is given as $$Y_1 = H_{11}*S + H_{12}*I \quad (1)$$

Where $H_{12}$ is the channel through which the interfering second baseband signal $I_2$ is received. In a correlator bank, the first radio station BS1 has already estimated the interference channel $H_{12}$ and hence it knows that the second sending station M2 is assigned to the second radio station BS2.

From receive signals of adjacent radio stations B and BS2, which broadcast their receive signals, it picks out a second receive signal from the second radio station BS2

$$Y_2 = H_{21}*S + H_{22}*I \quad (2)$$

in which pilot sequences are embedded which are used to estimate channel coefficients $H_{21}$ and $H_{22}$ in the joint signal detection unit JD. Additionally, an identifier of a time slot during which the second receive signal $Y_2$ was received by the second radio station BS2 can be provided together with the second receive signal $Y_2$.

Alternatively the channel coefficients $H_{21}$ and $H_{22}$ could be signalled by the second radio station separately from the second receive signal $Y_2$. Further instead of broadcasting their receive signals, the adjacent radio stations B and BS2 could be configured to transmit their receive signals if requested by the first radio station BS1.

Equations (1) and (2) can be written conveniently in matrix form $$\begin{pmatrix} Y_1 \\ Y_2 \end{pmatrix} = \begin{pmatrix} H_{11} & H_{12} \\ H_{21} & H_{22} \end{pmatrix} \begin{pmatrix} S \\ I_2 \end{pmatrix} \quad (3)$$

Now the first radio station BS1 has all information needed to cancel the inter-cell interference $I_2$ out of the first receive signal $Y_1$. Equation (3) states a conventional MIMO problem which can be solved by a number of well known algorithms, among which the zero forcing using the pseudo-inverse of the matrix H denoted as $H^+$ $$\begin{pmatrix} S \\ I_2 \end{pmatrix} = \begin{pmatrix} H_{11} & H_{12} \\ H_{21} & H_{22} \end{pmatrix}^+ \begin{pmatrix} Y_1 \\ Y_2 \end{pmatrix} \quad (4)$$

is the most simple one but has worst performance as well. Better but more complex algorithms are ordered successive interference cancellation (V-BLAST), sphere decoding or maximum likelihood detection. The desired first baseband signal S is picked out of the reconstructed signal vector $(S\ I)^T$ and detected while the interfering second baseband signal $I_2$ is discarded.

The first baseband signal S can be separated the better the more orthogonal the column and row vectors of the channel matrix H in (3) are and the more independent linear combinations of the same baseband signals are involved in the interference cancellation. This is called spatial diversity.

In general however, it is a complex task to select the right radio stations and sending stations needed to reduce the interference. As mentioned above, the first radio station BS1 estimates the channel coefficients also for sending stations served by other radio stations. Hence, the first radio station BS1 always has a selection of possible input signals to be used for the interference cancellation. This is called antenna selection in the literature. But unlike for antenna selection in MIMO systems, the number of sources (sending stations, having e.g., several antennas and sending baseband signals) for which the interference should be cancelled becomes uncertain when the system load is high.

Starting from the first receive signal $Y_1$, the first radio station BS1 is able to identify radio stations to which interfering sending stations are connected. Next the first radio station BS1 includes receive signals from corresponding radio stations and estimates the channels (arranged in the matrix H) between interfering sending stations and the corresponding radio stations. But these receive signals might contain additional interference.

Mathematically this is described so that the matrix H may have more columns than rows $$\begin{pmatrix} Y_1 \\ Y_2 \end{pmatrix} = \begin{pmatrix} H_{11} & H_{12} & 0 \\ H_{21} & H_{22} & H_{23} \end{pmatrix} \begin{pmatrix} S \\ I_2 \\ I_3 \end{pmatrix} \quad (5)$$

$$= \begin{pmatrix} H_{11} & H_{12} \\ H_{21} & H_{22} \end{pmatrix} \begin{pmatrix} S \\ I_2 \end{pmatrix} + \begin{pmatrix} 0 \\ H_{23}I_3 \end{pmatrix}$$

i.e. the second receive signal $Y_2$ of the second radio station BS2 is disturbed by a third baseband signal $H_{23}I_3$ e.g. of a third sending station (not shown in FIG. 1). Moreover, the left-handed pseudo-inverse of the matrix H does not exist anymore. Another strategy to separate the first baseband signals S is $$\begin{pmatrix} Y_1 \\ Y_2 \end{pmatrix} = \begin{pmatrix} H_{11} & H_{12} & 0 \\ H_{21} & H_{22} & H_{23} \end{pmatrix} \begin{pmatrix} S \\ I_2 \\ I_3 \end{pmatrix} \quad (5a)$$

$$= \begin{pmatrix} H_{11} & 0 \\ H_{21} & H_{23} \end{pmatrix} \begin{pmatrix} S \\ I_3 \end{pmatrix} + \begin{pmatrix} H_{12}I_2 \\ H_{22}I_2 \end{pmatrix}$$

While the quadratic matrices in (5) and (5a) may be invertible, there is always a residual baseband signal which results in unavoidable interference. Due to these residual terms, decentralized interference cancellation is often imperfect. But a partial interference cancellation is always practical and the target is not perfect but the best possible interference cancellation.

Note that the third baseband signal adds additional power for the detection of the first baseband signal as well. This already increases the SIR. The well-known macro diversity gains are related to this, and they are implicitly included in the full or partial interference cancellation described here.

In order to reduce the interference in (5) at least partially, one can write $$\begin{pmatrix} \hat{S} \\ \hat{I}_2 \end{pmatrix} = \begin{pmatrix} H_{11}^+ & H_{12}^+ \\ H_{21}^+ & H_{22}^+ \end{pmatrix} \cdot \begin{pmatrix} Y_1 \\ Y_2 \end{pmatrix} - \begin{pmatrix} H_{11}^+ & H_{12}^+ \\ H_{21}^+ & H_{22}^+ \end{pmatrix} \begin{pmatrix} 0 \\ H_{23}I_3 \end{pmatrix}. \quad (6)$$

The second term includes the interference that cannot be cancelled. It is not possible to completely remove the interference and to detect the first baseband signal S without interference as it was possible in the special case shown in equations (1) to (4). Instead a reconstructed baseband signal having residual interference can be calculated. The reconstructed baseband signal $\hat{S}$ reads $$\hat{S}=S-H_{12}{}^+H_{23}I_3 \qquad (7)$$

The residual interference is possibly smaller than without (partial) interference cancellation. Without interference cancellation the baseband signal reconstructed from $Y_1$, given by (1), is:

$$\hat{S}'=S-H_{11}{}^{-1}H_{12}I_2 \qquad (8)$$

Equation (7) gives a better result than equation (8) if the following relation is valid for the terms representing the residual interference: $H_{12}{}^+H_{23}I_3 < H_{11}{}^{-1}H_{12}I_2$ A third possible reconstruction equivalently results from (5a) and removes interference from the third baseband signal $I_3$. The respective equations are not shown. Before actually using one of the options for detecting the first baseband signal S, one must always take care that the partial interference cancellation has led to improved signal quality.

There are three possibilities to detect the first baseband signal S, i.e. a reconstructed baseband signal if interference can not be completely cancelled:
1. Live with the interference as it is (equation (8)).
2. Remove interference from the second baseband signal $I_2$ and live with additional interference due to the third baseband signal $I_3$ (equation (7)).
3. Remove interference from the third baseband signal $I_3$ and live with additional interference due to the second baseband signal $I_2$.

All options have to be considered and the one with the highest effective signal-to-interference ratio is selected. This can be continued using signals from further radio stations. Hence we get additional rows in the matrix H such that it may become invertible and the interference can be fully cancelled. But as above it is uncertain whether these additional baseband signals help or hurt, since potentially new interferers could get involved as well. Finding the right radio stations for cooperation turns out to be a complex optimization problem for which the optimal strategy is similar as described above but formulated below with a more general mathematics.

Let us assume that we have N−1 radio stations the baseband signals of which are accessible to the first radio station BS1 and that the total number of sending stations visible to (being received by) all radio stations is M.

$$\begin{pmatrix} Y_1 \\ Y_2 \\ \vdots \\ Y_N \end{pmatrix} = \begin{pmatrix} H_{11} & H_{12} & \ldots & H_{1M} \\ H_{21} & H_{22} & \ldots & H_{2M} \\ \vdots & \vdots & \vdots & \vdots \\ H_{N1} & H_{N2} & \ldots & H_{NM} \end{pmatrix} \begin{pmatrix} S \\ I_2 \\ \vdots \\ I_M \end{pmatrix} \qquad (9)$$

When N≤M, this is a standard MIMO problem which can be solved with the well known MIMO detection schemes such that inter-cell interference is fully cancelled. But when N>M, the interference cannot be perfectly cancelled. The task is then to minimize the residual interference of the sources the interference of which cannot be cancelled.

Let us consider a heuristic partial interference cancellation strategy. For intuition it is assumed that the interferers (i.e. baseband signals of sending stations, received e.g. by the first radio station BS1) are arranged in descending order of the Euclidean norms of their respective columns in the matrix H. In this way, the total interference power from the surplus interferers is minimized. This is of course suboptimal since one does not take into account the effect of this interference after the joint detection which would be optimal but requires that all variations of the interfering sources are considered until the best selection is found.

Whatever approach is used, the separation into cancelled interferers and others can be described as $$\begin{pmatrix} Y_1 \\ Y_2 \\ \vdots \\ Y_N \end{pmatrix} = \begin{pmatrix} H_{11} & H_{12} & \ldots & H_{1N} & 0 & \ldots & 0 \\ H_{21} & H_{22} & \ldots & H_{2N} & \vdots & \ldots & \vdots \\ \vdots & \vdots & \vdots & \vdots & \vdots & \ldots & \vdots \\ H_{N1} & H_{N2} & \ldots & H_{NM} & 0 & \ldots & 0 \end{pmatrix} \begin{pmatrix} S \\ I_2 \\ \vdots \\ I_N \\ 0 \\ \vdots \\ 0 \end{pmatrix} + \qquad (10)$$

$$\begin{pmatrix} 0 & \ldots & 0 & H_{11} & H_{12} & \ldots & H_{1N} \\ \vdots & \ldots & \vdots & H_{21} & H_{22} & \ldots & H_{2N} \\ \vdots & \ldots & \vdots & \vdots & \vdots & \vdots & \vdots \\ 0 & \ldots & 0 & H_{N1} & H_{N2} & \ldots & H_{NM} \end{pmatrix} \begin{pmatrix} 0 \\ \vdots \\ 0 \\ I_{N+1} \\ \vdots \\ I_M \end{pmatrix}$$

or in matrix-vector notation $$Y=(H_{1:N,1:N} 0_{N+1:N,1:M})(SI_{2:N} 0_{N+1:M})^T + (0_{1N,1:N} H_{N+1:N,1:M})(0_{1:N} I_{N+1:M}) \qquad (11)$$

Now the interference is partially cancelled for the first N interferers with a usual MIMO algorithm based on the partial matrix $H_{1:N,1:N}$ and the partial vector $(S\ I_2 \ldots I_N)^T$ while the signal of the other interferers is considered as additive noise. It is possible to take the covariance of this "noise" into account in the signal processing. As observed in (7), the other interferers result in an additional distortion of the desired signal after the partial interference cancellation.

A bottom-up approach is proposed how new radio stations are potentially involved in the interference cancellation process. Start with the strongest interferers already identified at the first radio station BS1 and take the radio stations serving these interferers at first into account. Each extra radio station adds another receive signal but potentially also one or more new dimensions of interferers. For each new antenna, the desired first baseband signal S is reconstructed using the partial interference cancellation algorithm described above and the residual variance of the interference is compared to the best previous results to make a decision whether it is useful to include this new antenna or not. This is repeated until no more new radio stations are available that reduce the residual interference.

The order in which new radio stations are involved may also have an effect on the decision. In the optimal way, any ordering of the antennas of all radio stations is considered and the one offering the best interference cancellation is used. In practise, this might be not feasible and another ordering can be used as a compromise.

Realization of the Meshed Backbone Network

Figure 3:
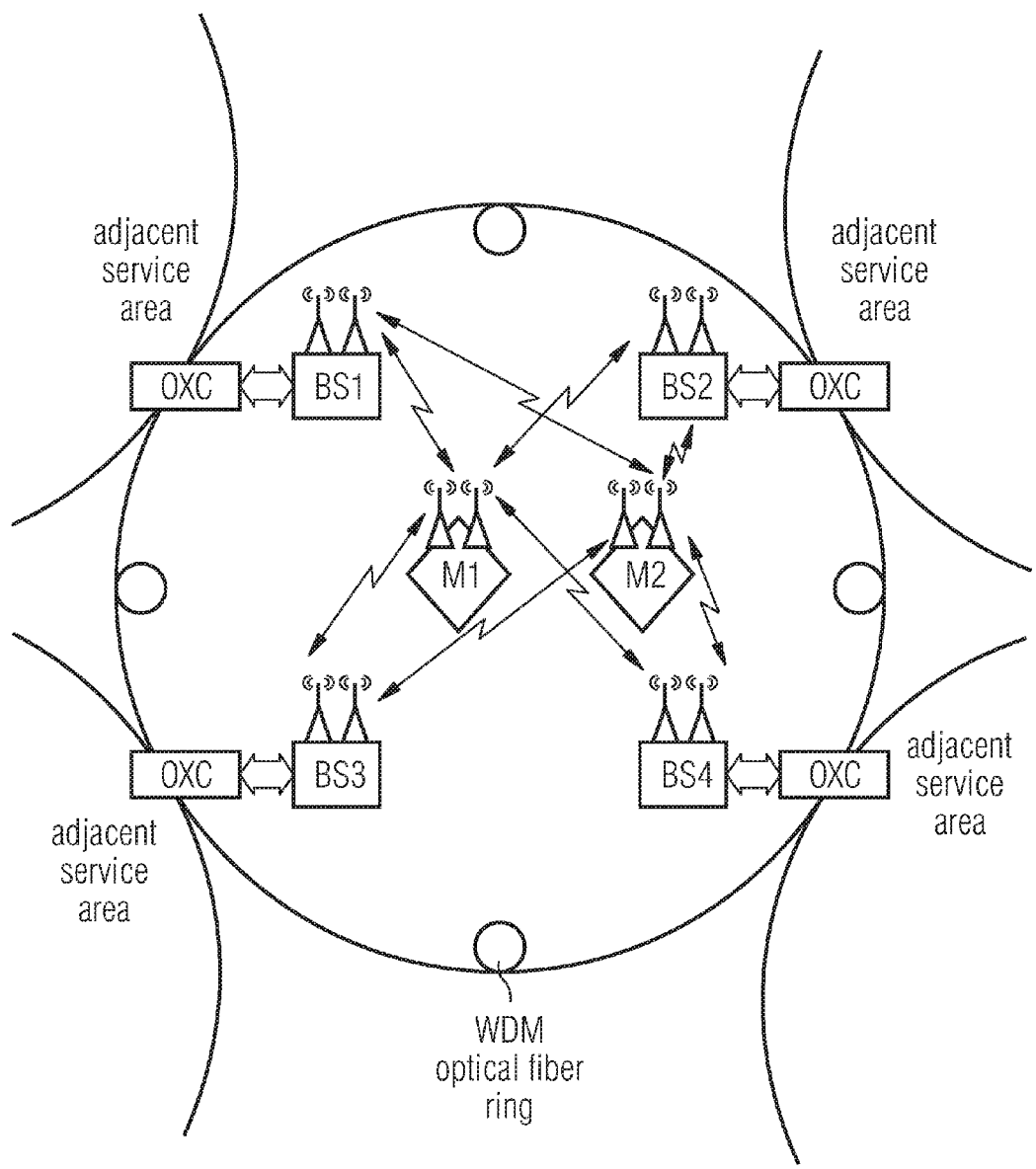
FIG. 3 a schematic drawing of the proposed radio communications system using a meshed network, and FIG. 4 schematic drawing of a service-area handover using service areas.

In the following an example is given how the underlying meshed backbone network can be realized. There are various options. In principle it can be realized using optical fiber, cable, microwave and free-space optical links. But it is certainly preferable to use a fixed optical fiber network based on wavelength-division multiplexing (WDM) technique. This is depicted in principle in FIG. 3, showing the first radio station BS1, the second radio station BS2, a third radio station BS3 and a fourth radio station BS4 as well as the first sending station M1 and the second sending station M2. The logical meshes in FIG. 1 are realized using an optical fiber ring, which is well established in metropolitan area fiber networks. The receive signal from each antenna of the radio stations is modulated on another wavelength such that it is available to all other radio stations in the same mesh.

Moreover, each radio station has an optical cross connect OXC which substantially contains at least one wavelength splitting and combining device known as arrayed waveguide grating (AWG). The optical cross connect OXC enables two functionalities: Firstly, it enables access to the receive signals from other radio stations within the mesh. Secondly it enables random access to the receive signals from radio stations connected to adjacent meshes.

A block of multiple wavelengths is assigned to each mesh. Over each optical cross connect OXC, the wavelength group of an adjacent mesh can be coupled in and multicast in the current mesh such that each radio station gets direct access to the signals from adjacent meshes as well. The total number of wavelength in a dense WDM system can be 100 or more. This allows even the use of multiple antennas at each radio station, if some reuse of wavelengths is done in distant meshes. This can be realized using the add-drop functionality of the arrayed waveguide grating.

IP Network Issues

Alternatively or combined with the optical meshed network it is possible to use a network based on the Internet Protocol (IP). In this case, using connections between radio stations based on IP, a receive signal of a radio station would be transferred to another radio station on request instead of broadcasting to save transmission resources, because IP-networks provide less bandwidth and therefore higher latency than optical networks.

In case that an IP network is used to connect the different radio stations the delay for data transmission is unpredictable. To assure that the correct signals are combined for interference cancellation a time stamp will be additionally attached to receive signals which are transmitted to a radio station on request, e.g. to the first radio station BS1.

To minimize data traffic on the limited bandwidth of an IP backbone and to reduce processing delay which would result in unwanted user latency, it is useful that for example the second radio station BS2 when receiving a request for the second receive signal, e.g. from the first radio station BS1, stores in a memory an identifier of the first radio station BS1 and an identifier of the first sending station M1 and/or identifiers of other sending stations of which baseband signals are contained in the second receive signal and/or the respective identifiers of radio stations to which the other sending stations are assigned, the identifiers being e.g. contained in the second receive signal of the second radio station BS2. This allows the second radio station BS2 to automatically transmit a receive signal to a radio station, e.g. the first radio station, to which the first sending station M1 is attached whenever the second radio station BS2 detects, e.g. in its receive signal, the same interference constellation—i.e. the same combination of identifiers of sending stations, which might additionally be assigned to the same radio stations as detected in connection with the second receive signal. Due to this advanced transmission of receive signals the number of time consuming requests of receive signals can be reduced. This advanced transmission of receive signals is especially useful if a sending station has to transmit a high amount of data, so that the probability for the same interference constellation is high.

When using an IP-network the radio stations are adapted to work with IP. This can be built in a radio station alternatively or additionally to the components needed for optical networks according to FIG. 2.

Service Area Handover Prediction

It is important to note what the term service area actually means in this decentralized infrastructure compared to the centralized concept. Actually, each sending station is surrounded by its own service area, i.e. service area is now a sending-station-centric term. A sending station is assigned to the radio station where it is received with the strongest signal power. The service area of a sending station is defined by the radio stations providing receive signals needed to suppress the interference in the best possible way.

Figure 4:
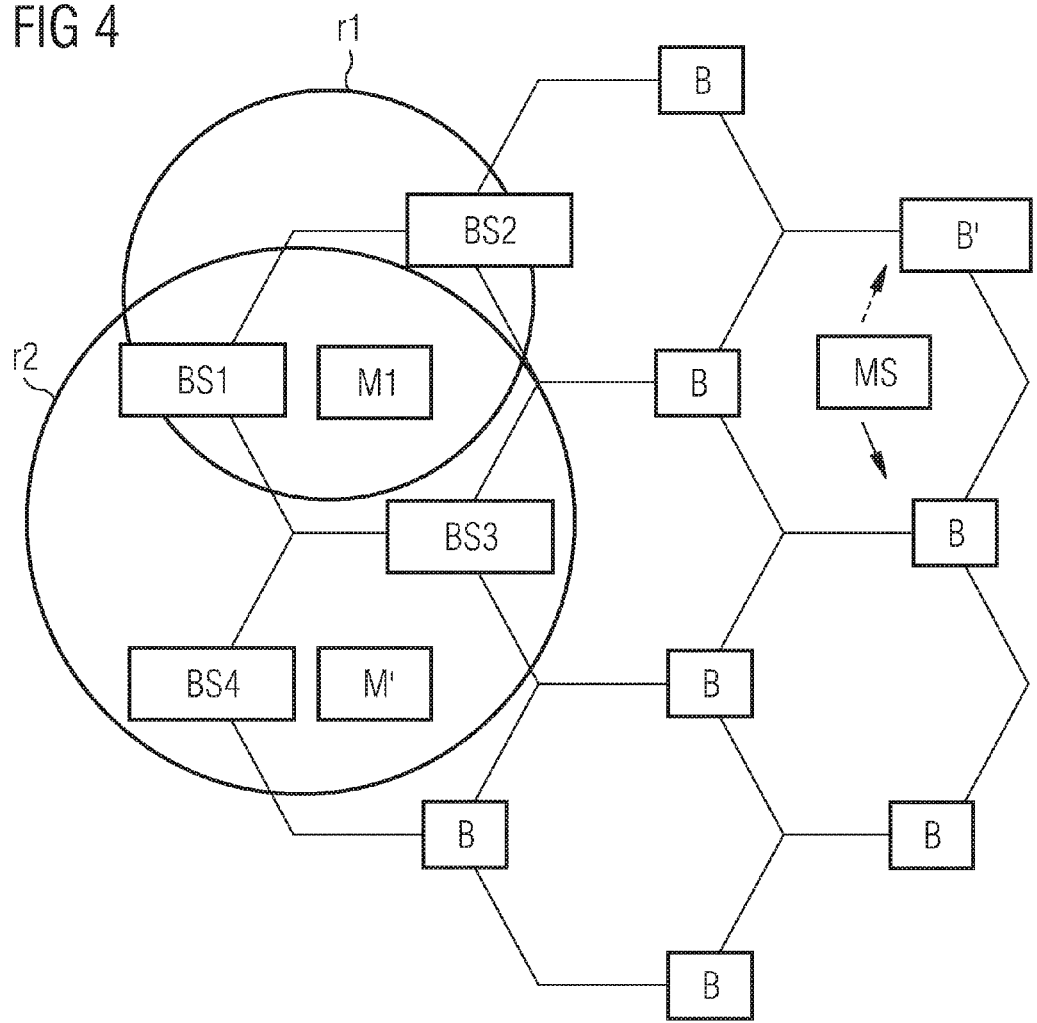

In this context, it may be of interest to mention a particular form of a handover (called service-area handover) which can occur for a given sending station. The difference to the conventional handover is shown in FIG. 4. In the conventional inter-cell handover (right), another radio station B' becomes responsible for the detection of a sending station MS instead of a radio station B. For this, a conventional protocol can be used.

A service area handover from a first service area r1 including the first radio station BS1 and the second radio station BS2 to a second service area r2, including the first radio station BS1, the third radio station BS3 and the fourth radio station BS4, occurs when it is more suitable to change the set of cooperating radio stations needed to detect a desired baseband signal so that the residual interference is minimized. Such service area handover might happen particularly when a new sending station M' becomes active in an adjacent cell. In order to cancel the suddenly rising interference, the receive signal from the radio station serving the interfering sending station, e.g. the third radio station BS3, must be included in the interference cancellation process of adjacent radio stations.

The handover occurs inside the serving radio station, in this example the first radio station BS1, and it causes a reconfiguration of the local MIMO signal processing used for the partial interference cancellation. In principle, no new protocol is needed for this. The serving radio station just switches another set of inputs to the multi-stream signal processing shown in FIG. 2.

But it could be helpful to establish a broadcast signalling channel over the fiber backbone in which each radio station broadcasts at which time and on which resources it is going to schedule all sending stations served in its cell. Based on this information, each of the surrounding radio stations may organize its interference cancellation in advance. The receive signals of radio stations serving potentially interfering sending stations can be automatically included in the multi-stream signal processing used for the local interference reduction, which is called service area handover prediction.

Combination with Semi Static Radio Resource Management (RRM)

As shown above, additional interference included from other sending stations into the receive signal causes a quite complex processing to find the optimum combination of sending stations taken into account for interference cancellation. Besides of the processing overhead this also increases the backbone overhead, which is an important topic for bandwidth limited IP-networks. So a very promising approach is to combine the co-operative detection algorithm with semi-static radio resource management where sending stations with different path loss—resulting in different transmit power—are scheduled in different frequency bands.

If suitably defined, sending stations transmitting in adjacent radio cells do not interfere with the same power, i.e. worst case interference situations can be avoided. For this reason the first selection of the receive signal is—with high probability—already the best selection avoiding the need for a complex search algorithm.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for detecting a first baseband signal in a radio communication system, comprising:
   receiving, by a first radio station via an air interface, the first baseband signal;
   receiving a first receive signal at the first radio station, the first receive signal containing the first baseband signal superposed with a second baseband signal that was sent from a sending station to a second radio station;
   receiving a second receive signal from the second radio station, the second receive signal having been received at the second radio station and containing the second baseband signal; and
   using the second receive signal for detection of the first baseband signal to cancel interference in the first receive signal caused by the second baseband signal, wherein
   a pilot sequence sent by the sending station is received at the first radio station,
   the pilot sequence identifies the sending station,
   the first radio station uses the pilot sequence for channel estimation,
   a detection signal is produced when detecting the first baseband signal,
   the second receive signal is used for detecting the first baseband signal when at least one of the following occurs:
      a reception power of the pilot sequence is greater than or equal to a threshold, and
      using the second receive signal reduces a residual interference contained in the detection signal, and
   the second receive signal is received at the first radio station via a broadcast message that was broadcast by the second radio station.

2. The method according to claim 1, wherein
   the second radio station is a serving radio station for the sending station, and
   the pilot sequence identifies the radio station as the serving radio station for the sending station.

3. The method according to claim 1, wherein a meshed optical fiber network is used to connect the first radio station and the second radio station.

4. The method according to claim 3, wherein the first radio station and the second radio station are part of the same mesh.

5. The method according to claim 4, wherein the first radio station only considers signals received from radio stations that are part of the same mesh as the first radio station.

6. The method according to claim 1, wherein
   the second receive signal contains baseband signals from a plurality of sending stations,
   each baseband signal has a corresponding sending station,
   the second receive signal contains pilot sequences for the sending stations having baseband signals contained in the second receive signal, and
   the pilot sequences are used at the first radio station for channel estimation.

7. The method according to claim 2, wherein
   a detection signal is produced when detecting the first baseband signal, and
   the second receive signal is used for detecting the first baseband signal only when at least one of the following occurs:
      a reception power of the pilot sequence is greater or equal to a threshold, and
      using the second receive signal reduces a residual interference contained in the detection signal.

8. The method according to claim 7, wherein a meshed optical fiber network is used to connect the first radio station and the second radio station.

9. The method according to claim 8, wherein the first radio station and the second radio station are part of the same mesh.

10. The method according to claim 9, wherein the first radio station only considers signals received from radio stations that are part of the same mesh as the first radio station.

11. The method according to claim 10, wherein the second receive signal is received at the first radio station via a broadcast message that was broadcast by the second radio station.

12. The method according to claim 11, wherein
   the second receive signal contains baseband signals from a plurality of sending stations,
   each baseband signal has a corresponding sending station,
   the second receive signal contains pilot sequences for the sending stations having baseband signals contained in the second receive signal, and
   the pilot sequences are used at the first radio station for channel estimation.

13. A radio communications system, comprising:
   a first sending station to send a first baseband signal via an air interface;
   a second sending station to send a second baseband signal via the air interface;
   a second radio station to receive a second receive signal via the air interface, the second receive signal containing the second baseband signal;
   a first radio station to:
      receive a first receive signal via the air interface, the first receive signal containing the first baseband signal superposed with the second baseband signal;
      receive the second receive signal from the second radio station; and
      use the second receive signal to cancel interference in the first receive signal caused by the second baseband signal, wherein
   a pilot sequence sent by the second sending station is received at the first radio station,
   the pilot sequence identifies the second sending station,
   the first radio station uses the pilot sequence for channel estimation,
   a detection signal is produced when detecting the first baseband signal,
   the second receive signal is used for detecting the first baseband signal when at least one of the following occurs:
      a reception power of the pilot sequence is greater than or equal to a threshold, and
      using the second receive signal reduces a residual interference contained in the detection signal, and
   the second receive signal is received at the first radio station via a broadcast message that was broadcast by the second radio station.

14. A first radio station for a radio communications system, comprising:
- a first receiver to receive a first receive signal containing a first baseband signal superposed with a second baseband signal, the first baseband signal being sent from a first sending station to the first radio station, the second baseband signal being sent by a second sending station to a second radio station;
- a second receiver to receive a second receive signal from the second radio station, the second receive signal containing the second baseband signal and being received at the second radio station via an air interface; and
- a detector to detect the first baseband signal using the second receive signal to cancel interference in the first receive signal caused by the second baseband signal, wherein,
- a pilot sequence from the second sending station is received at the first radio station,
- the pilot sequence identifies the second sending station,
- the first radio station uses the pilot sequence for channel estimation,
- a detection signal is produced when detecting the first baseband signal,
- the second receive signal is used for detecting the first baseband signal when at least one of the following occurs:
  - a reception power of the pilot sequence is greater than or equal to a threshold, and
  - using the second receive signal reduces a residual interference contained in the detection signal, and
- the second receive signal is received at the first radio station via a broadcast message that was broadcast by the second radio station.

15. The first radio station according to claim 14, wherein
- a pilot sequence sent by the second sending station is received at the first radio station,
- the pilot sequence identifies the second sending station,
- the first radio station uses the pilot sequence for channel estimation,
- the second radio station is a serving radio station for the second sending station,
- the pilot sequence identifies the second radio station as the serving radio station for the second sending station,
- a detection signal is produced when detecting the first baseband signal,
- the second receive signal is used for detecting the first baseband signal if:
  - a reception power of the pilot sequence is greater than or equal to a threshold and/or
  - using the second receive signal reduces a residual interference contained in the detection signal,
- a meshed network is used to connect the first radio station and the second radio station,
- the first radio station and the second radio station are part of the same mesh,
- the first radio station only considers signals received from radio stations that are part of the same mesh as the first radio station,
- the second receive signal is received at the first radio station via a broadcast message that was broadcast by the second radio station,
- the second receive signal contains baseband signals from a plurality of sending stations,
- each baseband signal has a corresponding sending station,
- the second receive signal contains pilot sequences for the sending stations having baseband signals contained in the second receive signal, and
- the pilot sequences are used at the first radio station for channel estimation.

* * * * *